Sept. 11, 1962 R. I. FROST 3,053,027
PAPER VALVE BAG APPLICATOR FOR PULVERIZED MATERIAL
Filed March 16, 1959 12 Sheets-Sheet 1

INVENTOR
RALPH IRVING FROST
BY *Chas. Denegre*
ATTORNEY

Sept. 11, 1962 R. I. FROST 3,053,027
PAPER VALVE BAG APPLICATOR FOR PULVERIZED MATERIAL
Filed March 16, 1959 12 Sheets-Sheet 2

INVENTOR.
Ralph Irving Frost
BY Chas. Denegre
Attorney.

INVENTOR.
Ralph Irving Frost
BY Chas. Denegre
Attorney.

Sept. 11, 1962 R. I. FROST 3,053,027
PAPER VALVE BAG APPLICATOR FOR PULVERIZED MATERIAL
Filed March 16, 1959 12 Sheets-Sheet 4

INVENTOR
RALPH IRVING FROST

BY *Chas. Denegre*

ATTORNEY

Sept. 11, 1962 R. I. FROST 3,053,027
PAPER VALVE BAG APPLICATOR FOR PULVERIZED MATERIAL
Filed March 16, 1959 12 Sheets-Sheet 8

INVENTOR
RALPH IRVING FROST

BY *Chas. Denegre*
ATTORNEY

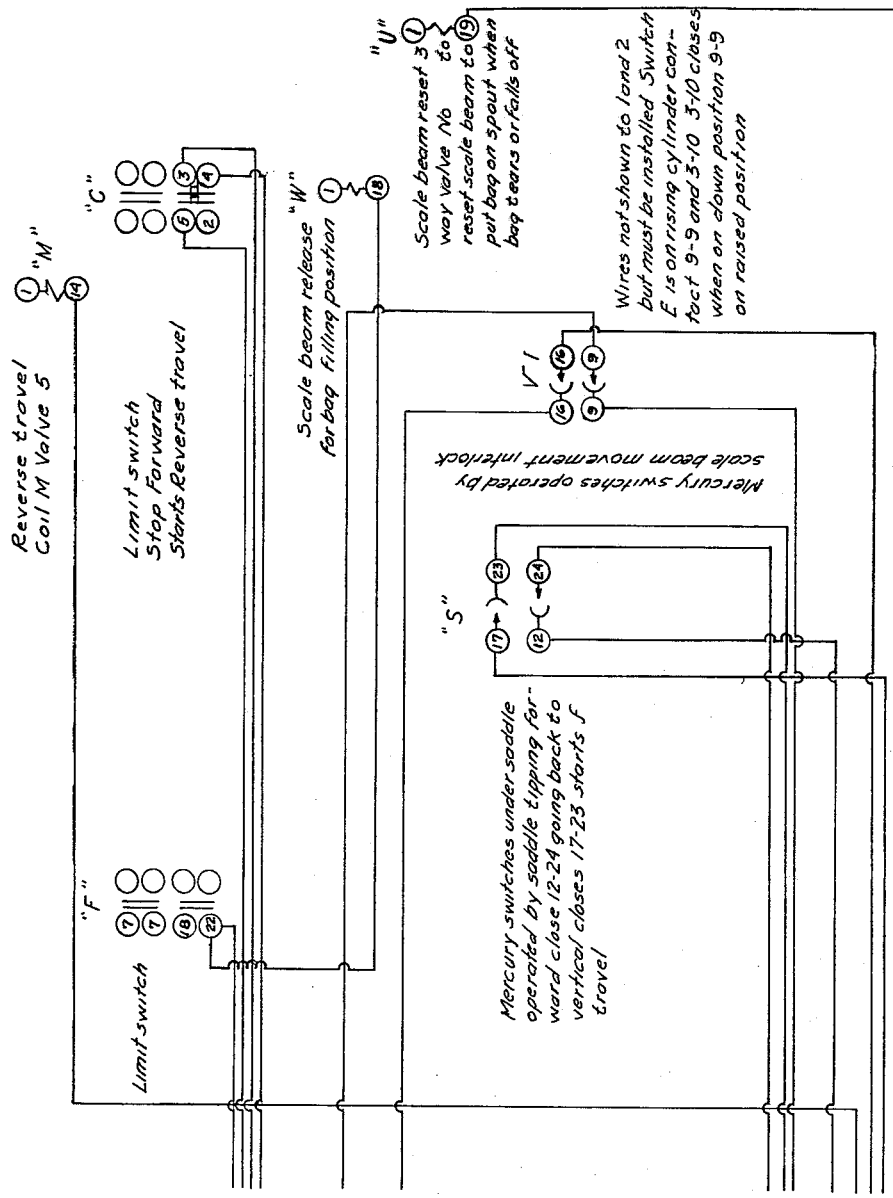

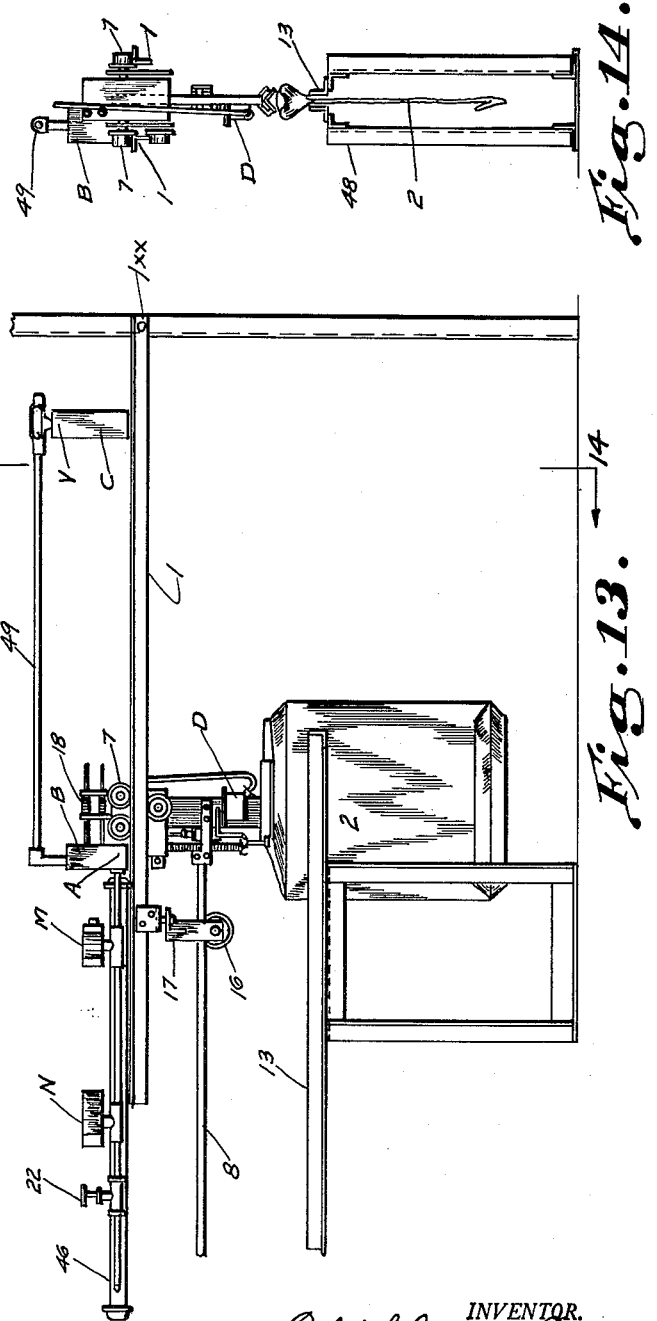

3,053,027
PAPER VALVE BAG APPLICATOR FOR PULVERIZED MATERIAL
Ralph Irving Frost, Ragland, Ala.
(3007 14th Ave., Sheffield, Ala.)
Filed Mar. 16, 1959, Ser. No. 799,810
3 Claims. (Cl. 53—190)

This invention relates to a paper valve bag applicator for pulverized material and is especially intended for filling paper valve type bags with cement. It has for its main objects to provide such a machine that will be highly efficient and satisfactory for its purpose, comparatively cheap to manufacture, easy to operate, and extremely durable.

A further object is to provide a machine that will require less labor for filling paper valve bags and the like with the result of lower production cost of the manufactured article.

Other objects and advantages will appear from the drawings and description.

Figure 1:
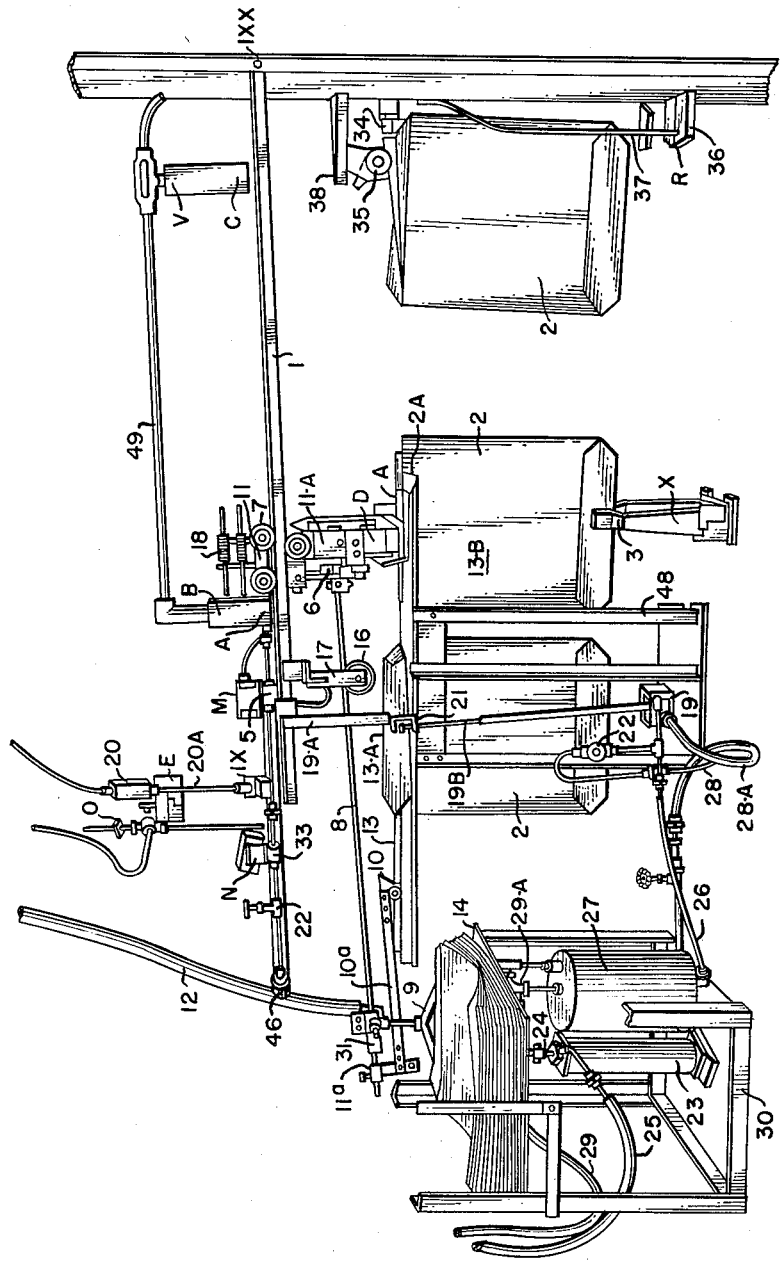
Figure 2:
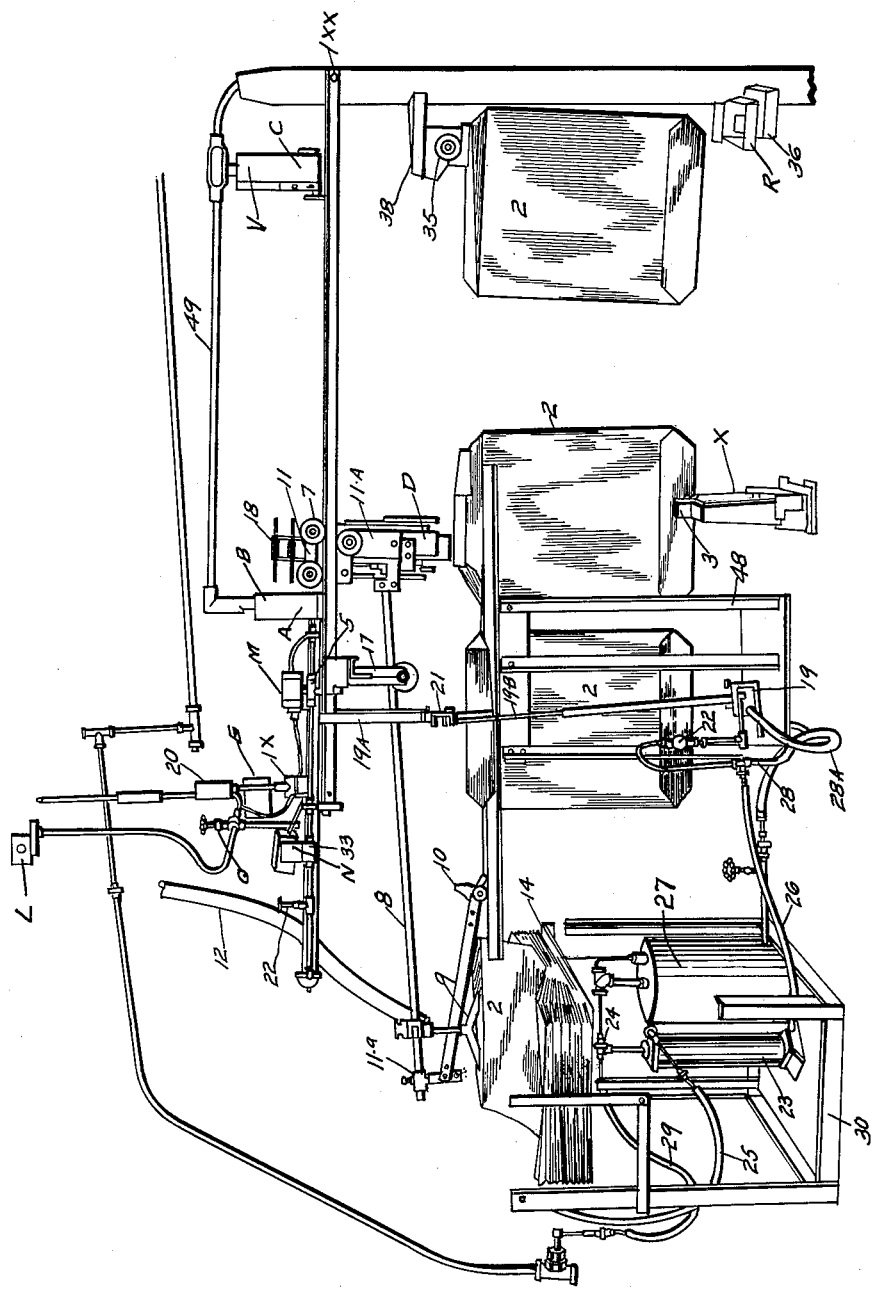
Figure 3:
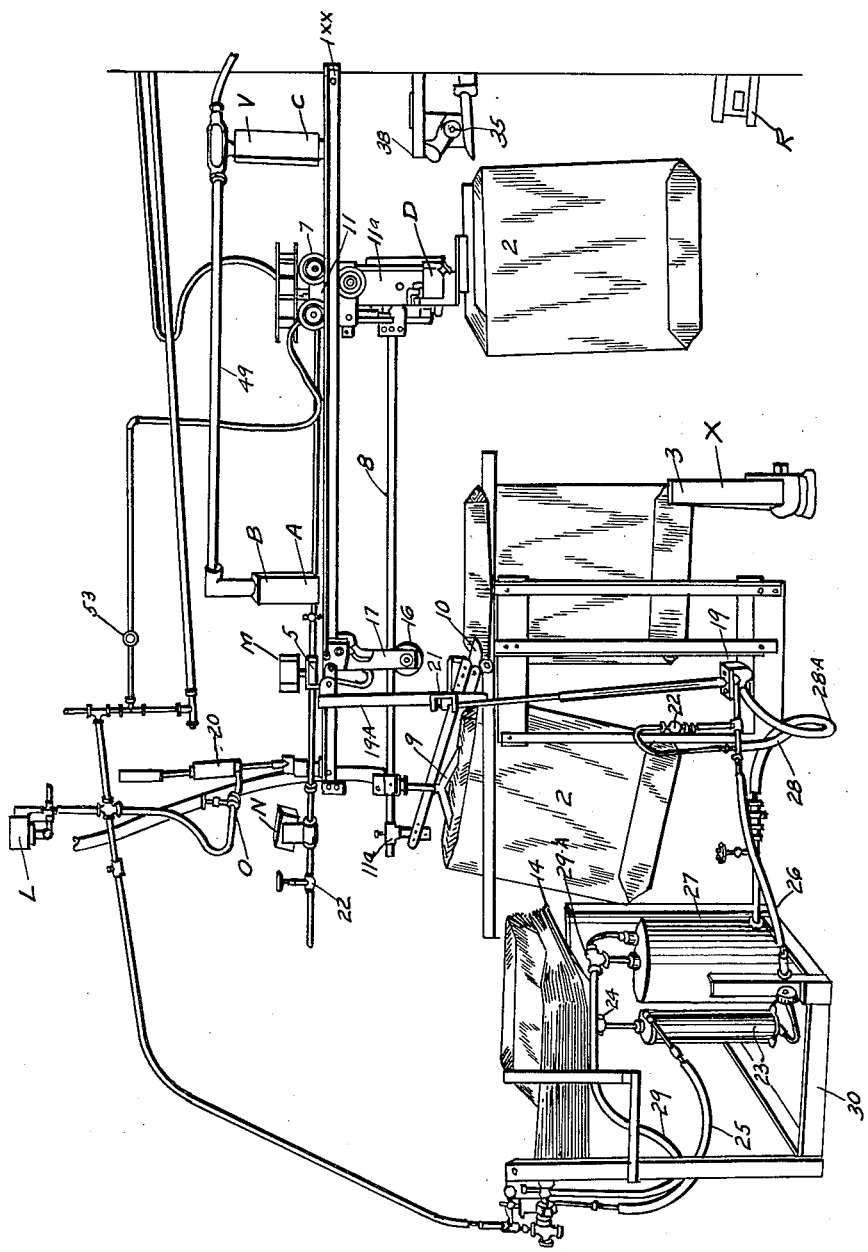
Figure 4:
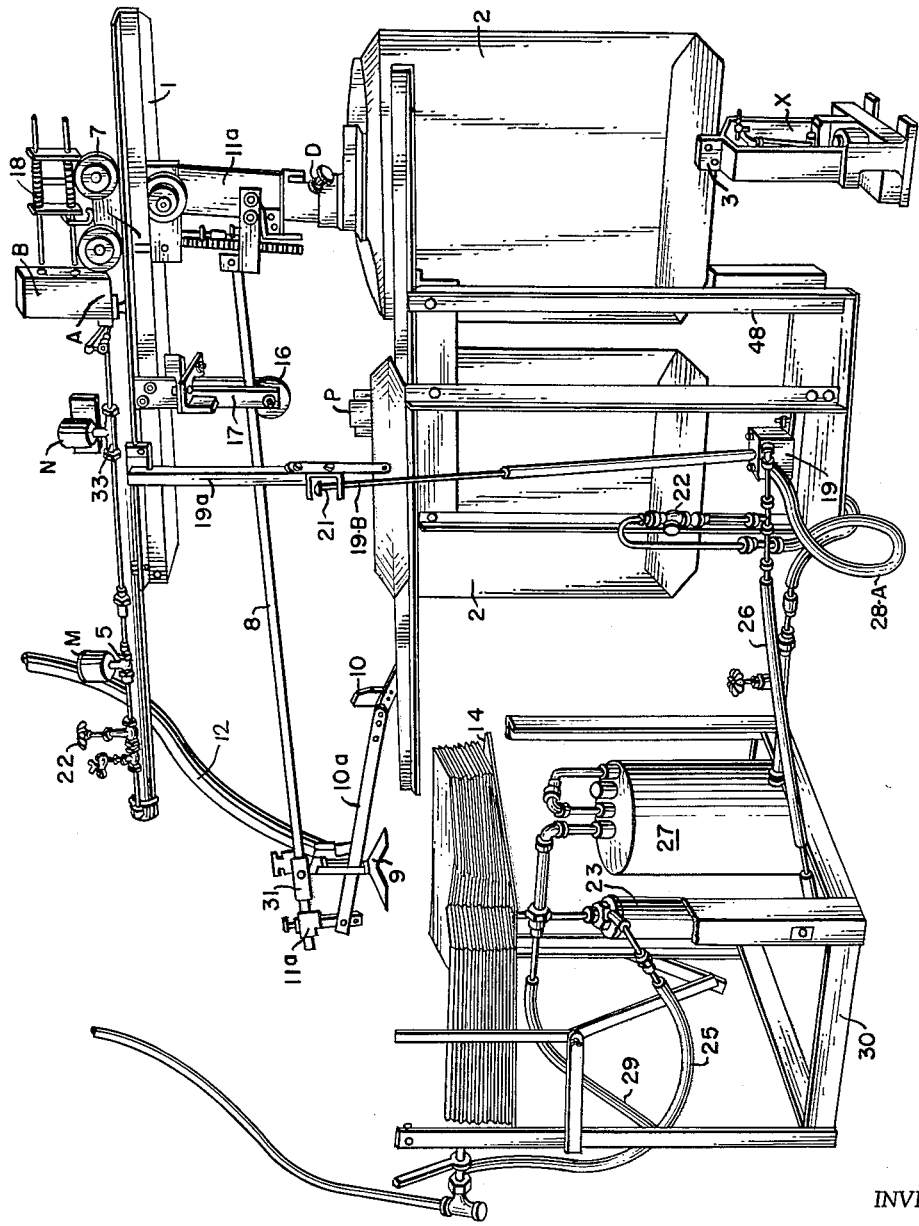
Figure 5:
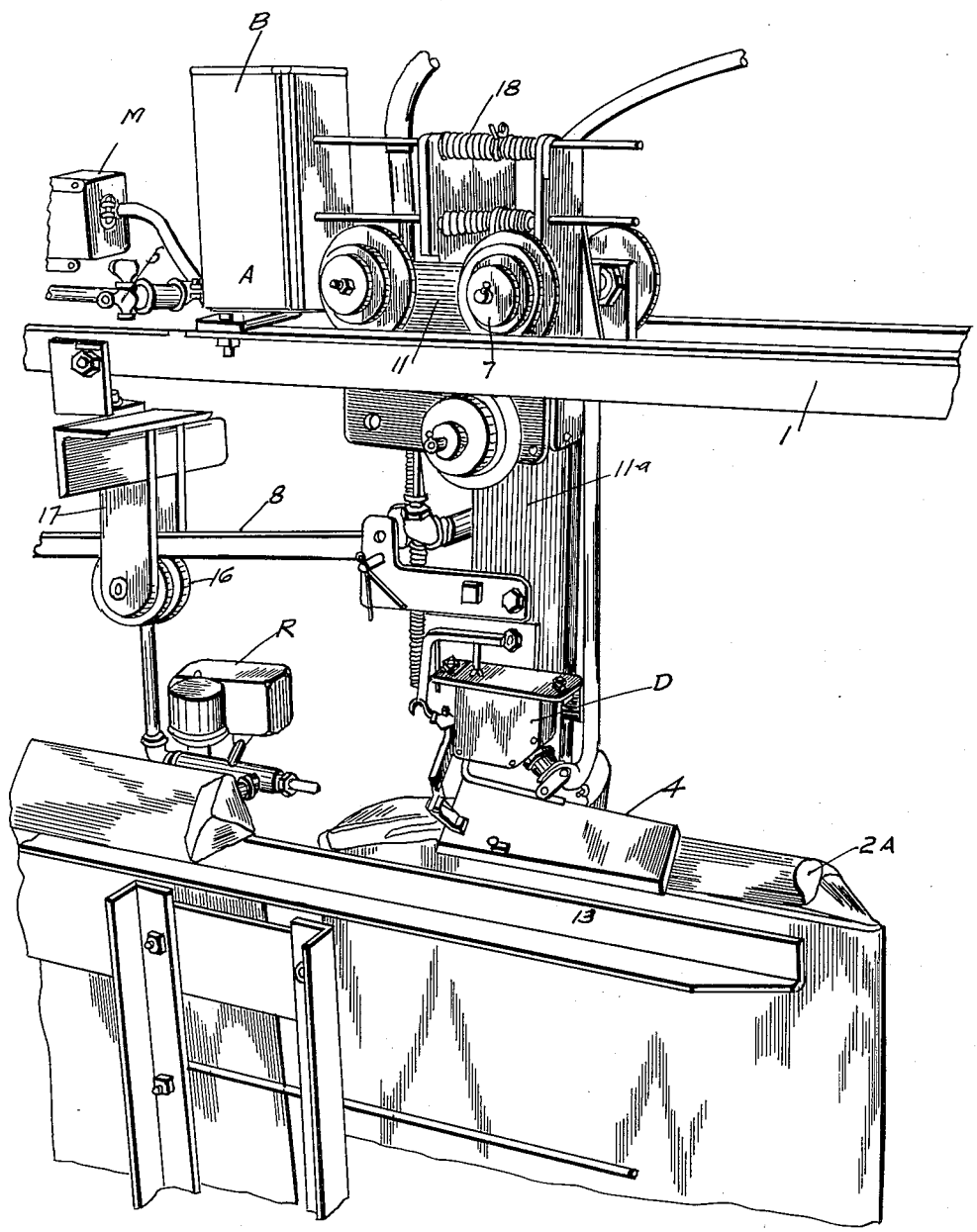
Figure 6:
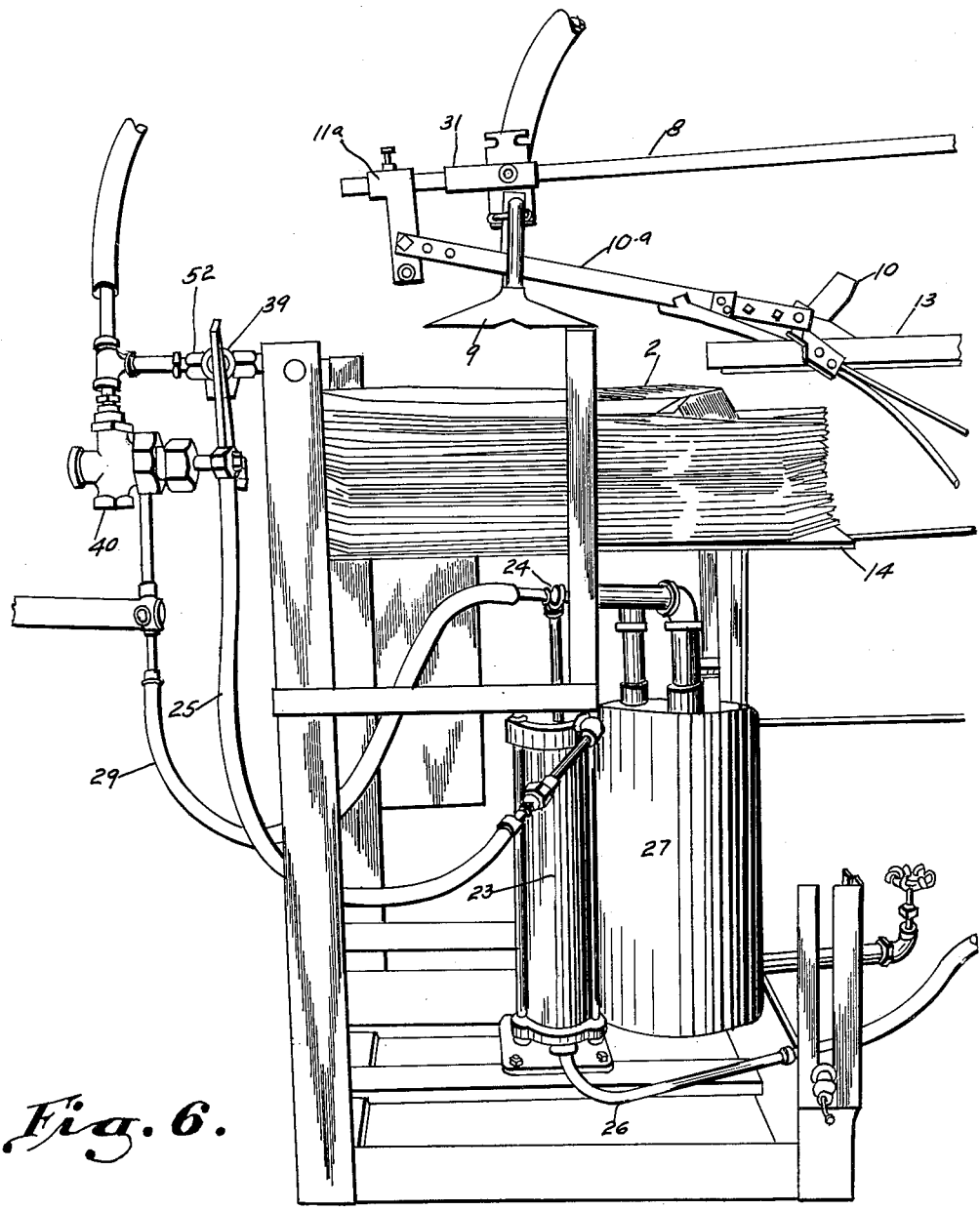
Figure 7:
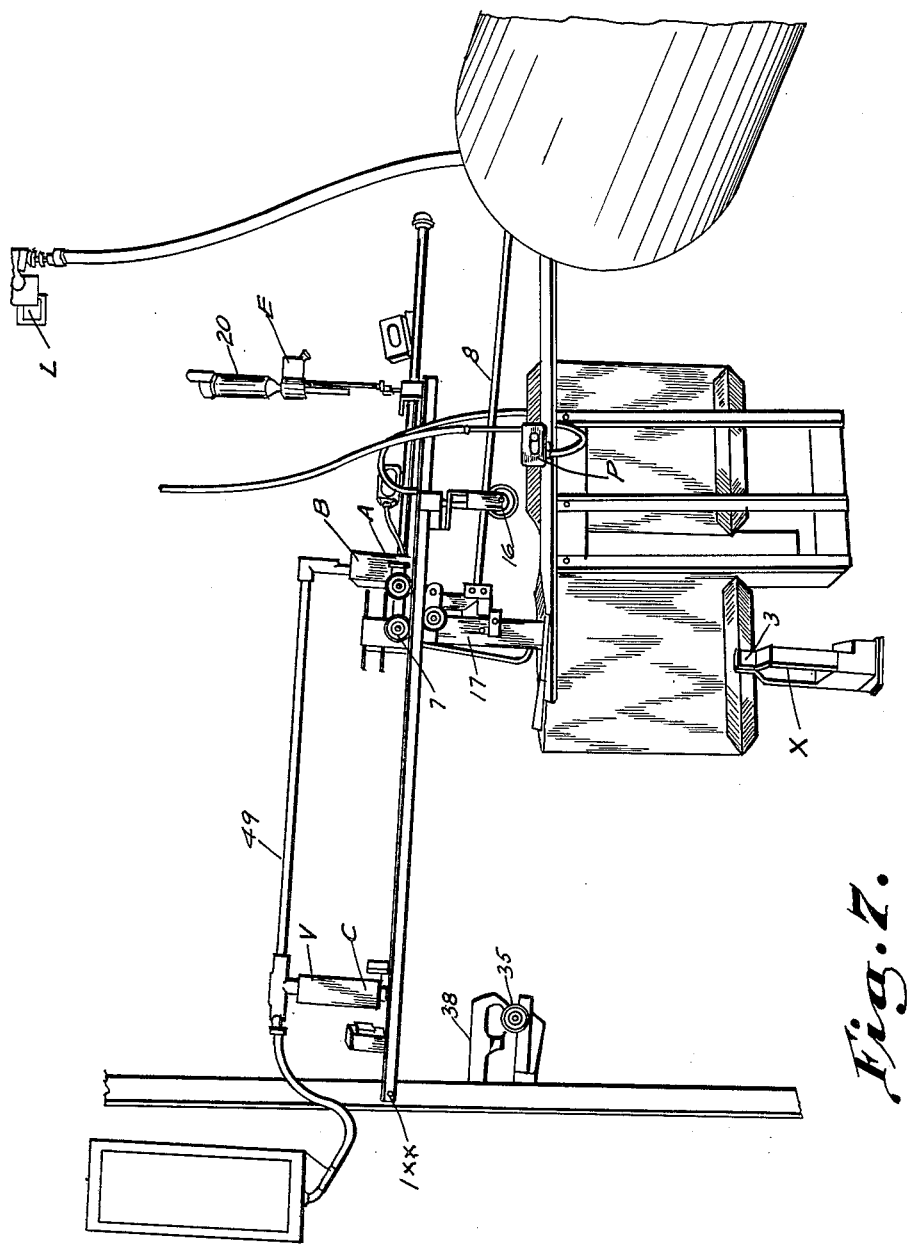
Figure 8:
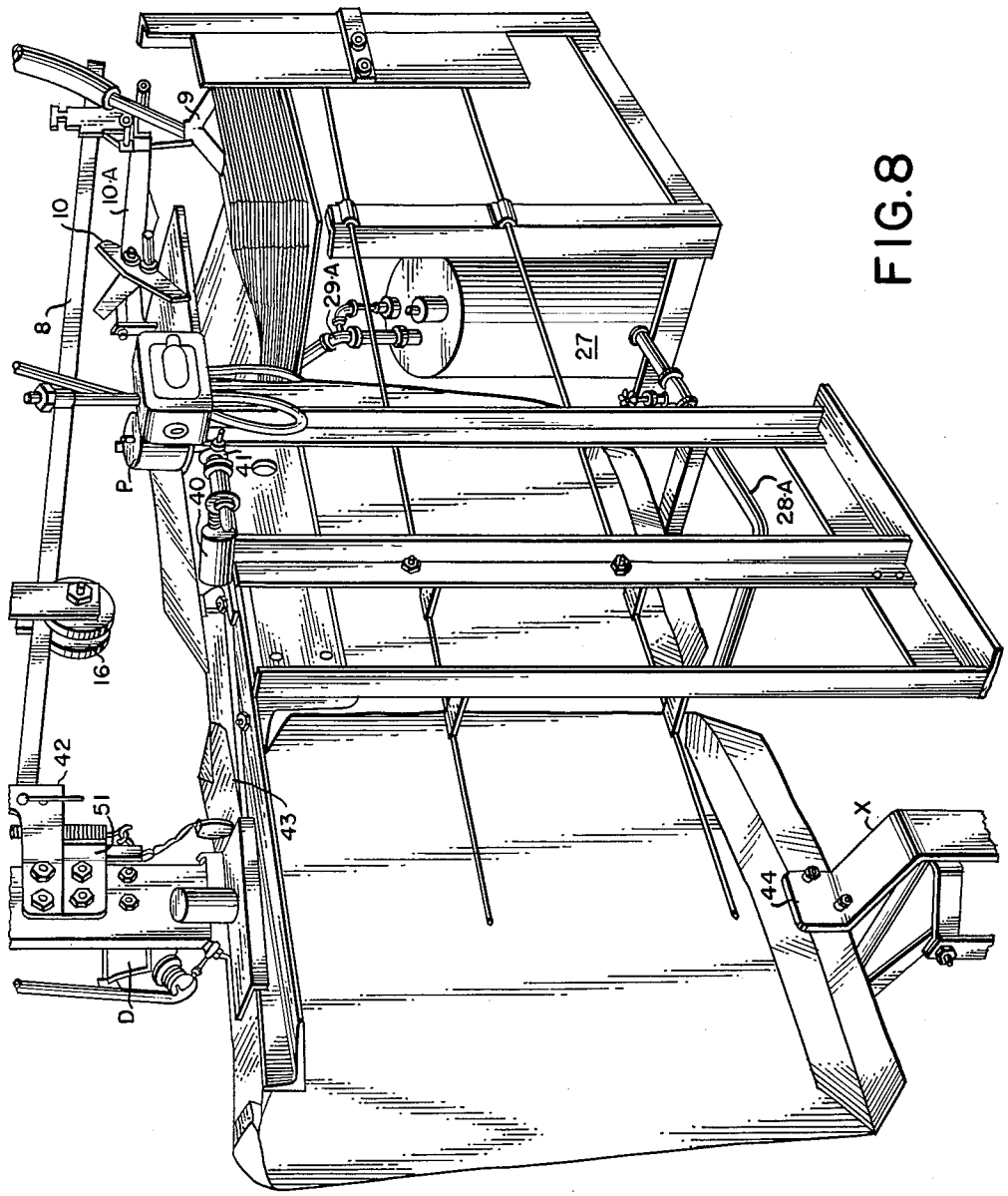
Figure 9:
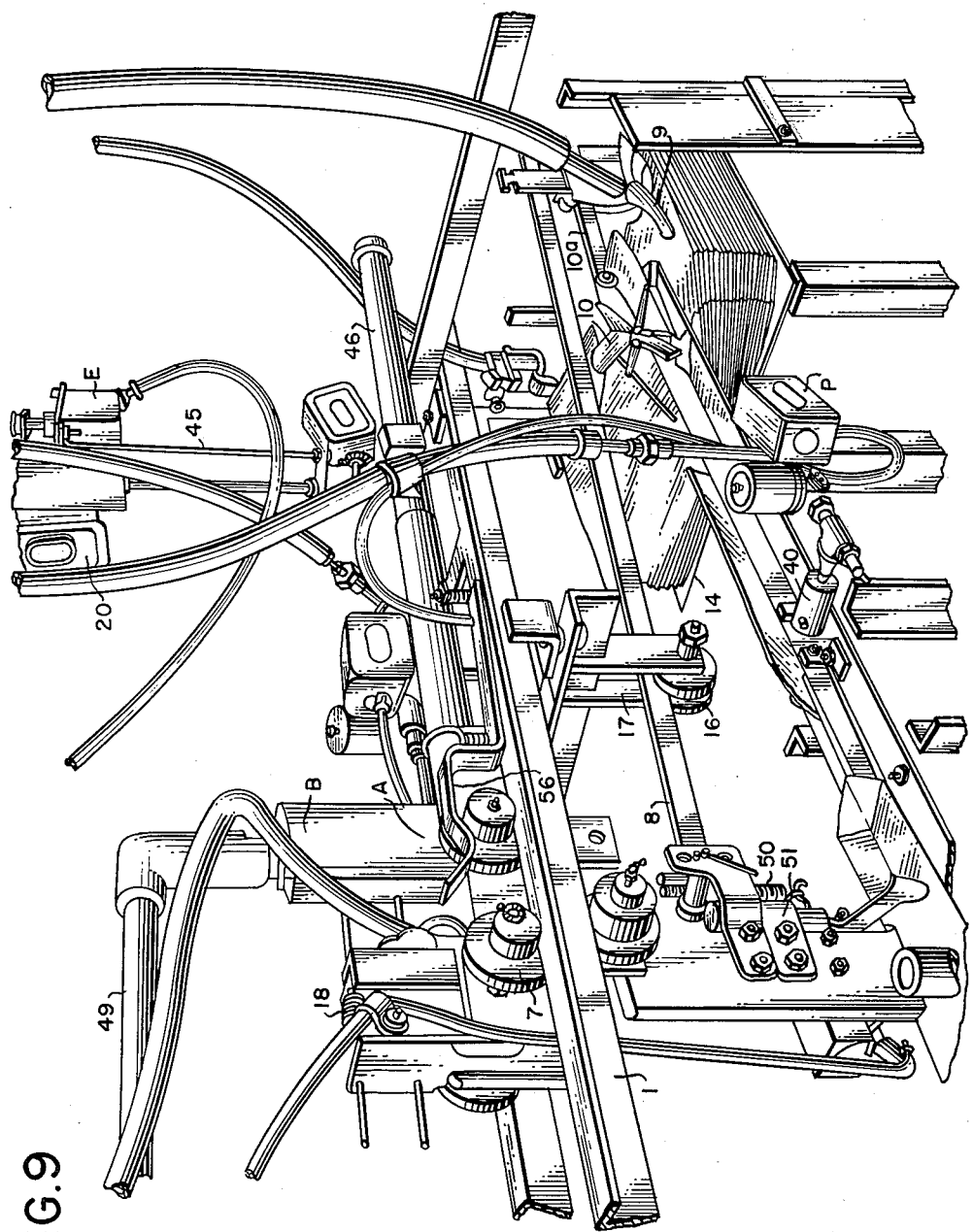
Figure 10:
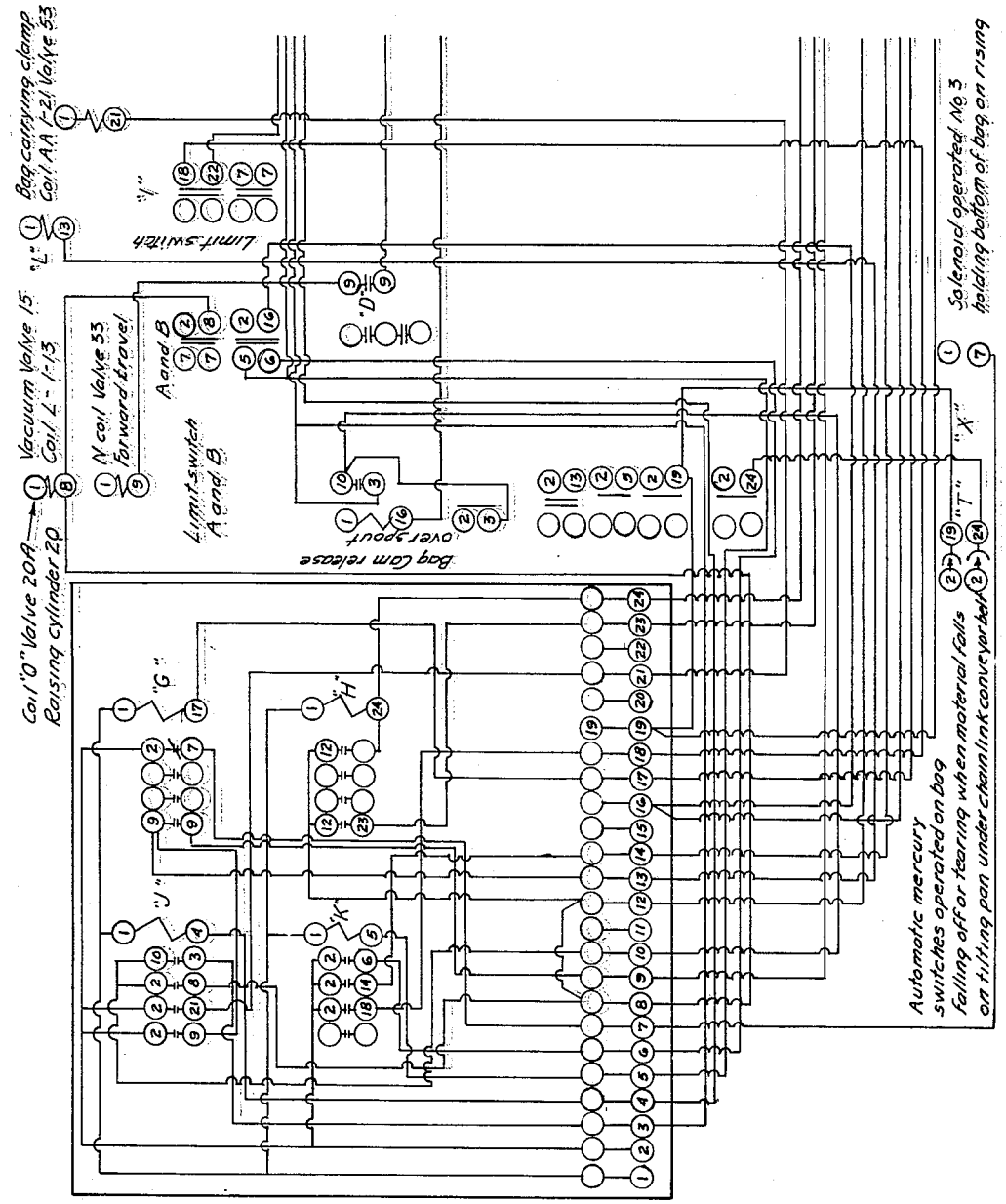

By referring generally to the drawings, a part of this application, it will be observed that FIG. 1 is a side elevation of the machine showing how the bags are picked up and carried along to the spout on the hopper; FIG. 2 is similar to FIG. 1 and shows the bags further along toward the spout except the one on the spout; FIG. 3 is similar to FIGS. 1 and 2 and shows three bags in different positions further along toward the spout; FIG. 4 is an enlarged elevation of part of the machine; FIG. 5 is an enlarged elevation of the central portion of the machine; FIG. 6 is an enlarged elevation of the starting end portion of the machine; FIG. 7 is an enlarged elevation on the other side of the center portion of the machine; FIG. 8 is a perspective view of the machine except that part near the spout; FIG. 9 is an enlarged perspective view of the starting and middle portion of the machine; FIGS. 10 and 11 are diagrams of the electric controls of the machine; FIG. 12 is a plan view of the machine track as it appears in FIGS. 1 to 6, inclusive, and FIG. 13 is a side elevation of FIG. 12; and FIG. 14 is a sectional view on line 14—14 of FIG. 13. The viewing direction of certain of the figures is indicated in FIG. 12.

Describing the electrical components in FIGS. 10 and 11, "A" and "B" represent limit switches at the front of the bag carrying clamp "4" carriage track which are operated by the travel of the carriage with contacts 5/6 which close on slight carriage travel and are maintaining contacts. For reverse travel 2/8 also close which are maintaining contacts for holding the bag carrying clamp up on return travel by raising cylinder 20 on reverse travel 2/16 are opened and are for beam reset, for filling of bag, "C" represents limit switch at extreme forward travel having contacts 3/4 which open and stop forward travel closing contacts 2/5 starting reverse travel "D" represents on bag carrying clamp carriage with contacts 9/9 which must be closed and are interlock in forward travel circuit closed on raised position of carriage and open on lowered position, "E" represents limit switch on raising cylinder with contacts 10/3 open on raised position, closed on lowered position closing contactor "J" to close contacts 2/9::2/21—2/8::10/3 "F" represents limit switch center travel track operated carriage with contacts 18/22, "G" represents relay in cabinet with contacts 2/7 which energize lower bag clamp X3 contacts normally open contacts 9/9 cause forward travel when relay "G" closes "H" represents relay in cabinet with contacts 12/24 and 12/23, "I" represents limit switch on travel track front A&B with contacts 18/22 close on forward travel and open on reverse travel of carriage, "J" represents relay in cabinet operated by switch "E" with contacts 2/9—2/21—2/8—10/3 where 2/9 goes to relay "G" 2/21 to bag carrying clamp 4, 2/8 to bag carrying raising cylinder 20, 10/3 is maintaining contact for relay "J," "K" represents reverse travel relay in cabinet with contacts 2/18::2/14—2/6, 2/18 is scale beam release to solenoid "W" on reverse travel only, 2/14 to reverse travel 3 way valve "M," 2/6 is maintaining contact for relay "K," "L" represents vacuum valve 15 with coil L 14/1 to vacuum fixture "9," "M" represents reverse travel valve 5 operated by closing 2/14 relay "K" to coil 14/1, "N" represents forward travel valve 33 operated by closing "V"1—16/16—"D" 9/9—J9/9 "G" 9/9, "O" represents coil O which operates raising valve 20A for raising cylinder 20, operated by contacts 2/8 relay "J," "P" represents bag holding cylinder 40 which holds bag at 13A from being pulled back (FIG. 8) by bag pusher 10, "Q" indicates switch for relay "G" to start forward travel when tilting device under conveyor is operated by material falling on it resetting scale beam and starting forward automatically "R" indicates mercury switch under saddle with contacts 12/24 which closes relay "H" in cabinet, "T" indicates switch under tilting device under conveyor 2/19 resets scale beam, 12/24 starts forward, travel closing relays "H" and "G" in cabinet resetting scale beam to replace bag which fell off or was torn, "U" indicates scale beam reset solenoid valve to reset beam for placing bag on spout, "V" indicates bag cam release solenoid over spout 34 to release bag that bag may fall off tipping saddle 37, "W" indicates solenoid over rear of beam locking device to release beam to filling position, "X" indicates solenoid to close bottom bag holding clamp 3 operated by contacts 2/7 on relay "G2" when open. This completes electrical component description.

Referring to the drawings in detail it will be seen that 1 indicates the bag carrying track that is hinged at 1xx and raises at 1x sufficiently to open valve 2–A on bag 2 at position 13–B; 3 indicates the bag opening clamp operated by solenoid X that holds the bag down while valve 2–A is being opened by the raising of 1 at 1–X; 4 indicates the bag carrying clamp which is closed when solenoid valve M opens air valve 5 to admit air to air cylinder 6 closing bag carrying clamp 4; 7 indicates the flanged wheels attached to bracket 11 that acts as a carriage for bag carrier clamp 4, and also has attached thereto limit switch D, vacuum carrying rod 8 with vacuum device 9, bag placing pusher 10, with adjustable clamp 11–a and vacuum hose 12. The vacuum bag pick-up device 9 picks a bag 2 up on table 14 and places the bag at 13–A'' to be ready to be placed at 13–B by bag placing device 10–a and 10, having adjusting means 11–a for correct setting. 12 indicates the vacuum hose from valve 15 operated by solenoid L. 13 indicates the bag placing track. 14 indicates the table for bags adapted for raising by vacuum device 9. 16 indicates the roller for guiding bar 8 attached to holding fixture 17 which is fastened to bag carrying track 1. 18 indicates rods to operate switches A and B—V and C fastened to part 11. 19 indicates hydraulic displacement pumps operated by rod 19–B and fixture 19–A which is secured on part 1 and operates when 1 is raised by cylinder 20 and piston 20–A. 21 indicates the adjusting clamp to properly set the length of stroke to correctly lift bag feeding table 14 to the desired height. 22 indicates the pressure regulating check valve to retain sufficient pressure to lift bag table 14 by hydraulic cylinder 23 and piston rod 24. 25 indicates the air hose to cylinder 23 to push it down for reloading of bags. Oil is pushed through hose 26 to reserve oil tank 27 through valve 22 and hose 28. Air hose 29 leads to top of tank 27. The frame for the bag table is indicated by 30. Adjusting clamp 31 is for adjusting vacuum device 9 to its proper position for picking up a bag. A pinch valve 32 is provided for adjusting the speed of forward bag travel. Forward travel valve 33 is operated by solenoid N. The spout 34 is for supporting a bag while it is being filled while being there held by clamp 35. A limit switch 36–R operates when saddle 37 lowers and drops off the bag being filled. Holding device 38 is a holding and release mechanism operated by a solenoid. The 4-way valve 39 is for raising and lowering the bag table 14. Cylinder 40 acts to clamp the bag on the bag placing track to keep the bag from being pulled backward on bag placing bar 10. Valve 41 delivers air to cylinder 40 and is operated by solenoid P. Device 42 is for holding the bag carrying clamp and vacuum fixture. Spring 43 holds bag firmly against one side to thus keep the bag from falling through the bag placing tracks. Rubber pads 44 are provided on the bag valve opening clamp to more securely hold the bag. Tripper rod 45 operates limit switch E which will not let the mechanism travel forward until 1 is raised. Cylinder 46 is air operated and is for forward and reverse travel. Piston rod 47 extends from cylinder 46 to bag travel device 11. Frame 48 holds the bag placing track 13. Conduit 49 is for wiring. Spring 50 to open bag carrier. Clamp 51 for bag clamp piston. Limit switch 52 to stop bag travel, operated by opening air valve to lower table 14 and is in forward travel circuit. A 3-way valve 53 to automatic bag carrying clamps, also discharges air from cylinder to vacuum to cause vacuum to release bag instantly and not carry bag on reverse travel. Guide 54 for bag, upper. Guide 55 for bag, lower. Spring clamp 56 to keep 11 part from creeping.

From the foregoing it will appear that to operate the machine it is necessary to start the vacuum pump, open the air valve, and close the switch that supplies energy to terminals 1 and 2 in the control box for 110 v. 60 cycle A.C. current.

If machine is stopped with vacuum bag lifter over bag switch A–32 and switch 3/4 will be closed. This in turn will energize coil J closing 2/24=2/9=2/3 and 2/8 causing vacuum valve L to open to pick up bag, also energize solenoid O opening valve 53 to close bag carrying clamp which when it closes operates limit switch D closing contacts 9–17-D. Limit switch E on top bag track closes on bottom of bag carrying track position. Switch E is normally closed in the raised position of 1 and normally open in the lowered position of 1. Switch B–8/2 closes clamping bag at 3–X. F is an interlock switch and is in open position while bag is being filled and closes when scale tips off bag causing forward travel. This is necessary to control bag travel to proper instant of time.

Valve 53 will not open for forward travel until switches D—E—F—G are closed. D is on bag holder and must be closed on bag. E on top of bag travel tracks. F on next spout as bag must be on spout to open in proper sequence so as two bags are not discharged at the same time causing them to be piled on top of each other or crossed. Switch B–8/2 opens on 1" of forward travel to release 3.

When all above are in their correct operating position, bag will go forward and be placed on spout at same time bag pusher pushes bag into position 13–B and vacuum device 9 drops bag at position 13–A.

When forward position is completed switch C–4/3 opens causing vacuum valve to close and valve 53 opens discharging air in vacuum to quickly release bag carried to forward position 13–A, forward valve 33 opens. Raised position is maintained by contactor S, actuated by 18.

Reverse travel 5 is operated by solenoid M. When completed travel is made contacts A–6–5 and B–8–2 open causing reverse travel 5 to close and contacts B–7–2 and A–3–2 repeating as B–7–2 closes bag valve opening holder 3 to clamp bag while A–3–2 operates contactor J–L–O-part X.

On lower cheek of saddle is a time switch that resets time and delay, and if bag does not start filling at a determined time-delay, the switch opens an air valve to break bridge in the spout. If bag is filling properly this air valve will not operate.

The various parts of the machine may be made of any material suitable for the purpose. Also the parts may be made in different sizes and capacities depending on how and where to be used.

While I have shown and described the preferred embodiment of my invention, I do not wish to limit same to the exact and precise details of structure, but reserve the right to make all modifications and changes so long as they remain within the scope of the invention and the following claims.

Having described my invention I claim:

1. A bag applicator of the character described comprising a supporting frame, a table for supporting a plurality of paper valved bags piled flat upon each other, said table having means for effecting a raising and lowering thereof, a device mounted in said frame and over said table, said device having vacuum means for attaching and lifting one bag at a time, a track supported in said frame for receiving a bag from said device and supporting the bag in a perpendicular position, means in said frame for pushing the bag along said track, means mounted in said frame along said track for opening the valve of the bag, a bag filling spout mounted at the end of the frame and track opposite the end having the vacuum device, and means in said frame adapted to carry the bag in its perpendicular position from said track and place the opened valve of said bag over said spout.

2. A bag applicator of the character described for use in filling paper bags with pulverized dry material comprising means for supporting a plurality of paper valved bags folded flat and placed in a pile, means for picking up one bag at a time and changing it from a horizontal flat position to a perpendicular position, a track for receiving a bag from said pick-up means in the perpendicular position, means for moving a paper bag along said track, means for opening the valve of a paper bag while it is disposed along said track, a filling spout adjacent one end of said track, and means for moving a paper bag to said spout and placing the integral valve of said bag over said spout.

3. A paper bag applicator of the character described comprising, in combination, a main supporting frame structure for its parts, a table, said table being adapted for supporting a plurality of paper bags piled flat upon each other, each of said bags being closed at one end and having a valve in its other end, said table having adjacent thereto means for raising and lowering the table top, a device mounted in said main supporting structure, said device having vacuum means for attracting and lifting one bag at a time, a track supported in said structure for receiving a bag from said device in a perpendicular position, means for moving said bag along said track, means mounted along said track for opening the valve of the bag, a spout mounted at the end of said frame structure and track opposite the end having the table, and means to carry said bag from said track to said spout and place the valve of said bag over said spout.

References Cited in the file of this patent
UNITED STATES PATENTS

| | | |
|---|---|---|
| 1,782,733 | Lilly | Nov. 25, 1930 |
| 2,540,489 | Pretzer | Feb. 6, 1951 |
| 2,609,134 | Korber | Sept. 2, 1952 |
| 2,833,097 | Petrea et al. | May 6, 1958 |
| 2,834,166 | Fogwell et al. | May 13, 1958 |
| 2,848,857 | Watts | Aug. 26, 1958 |
| 2,923,111 | Selock | Feb. 2, 1960 |